US010279731B2

United States Patent
Suzuki

(10) Patent No.: US 10,279,731 B2
(45) Date of Patent: May 7, 2019

(54) TURN CANCEL SIGNAL OUTPUT DEVICE FOR VEHICLE

(71) Applicant: Yazaki Corporation, Minato-ku, Tokyo (JP)

(72) Inventor: Norihito Suzuki, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/678,148

(22) Filed: Apr. 3, 2015

(65) Prior Publication Data

US 2015/0210208 A1 Jul. 30, 2015

Related U.S. Application Data

(63) Continuation of application No. PCT/JP2013/076145, filed on Sep. 26, 2013.

(30) Foreign Application Priority Data

Oct. 5, 2012 (JP) .................................. 2012-223495

(51) Int. Cl.
*B60Q 5/00* (2006.01)
*B60Q 1/40* (2006.01)
*B60Q 1/42* (2006.01)

(52) U.S. Cl.
CPC .................... *B60Q 1/40* (2013.01); *B60Q 1/42* (2013.01)

(58) Field of Classification Search
CPC ...... G08B 29/14; G08B 17/06; G08B 29/145; G08B 29/12; G08B 25/14
USPC .... 340/514, 3.71, 6.1, 870.09, 501, 506, 5.1
See application file for complete search history.

(56) References Cited

U.S. PATENT DOCUMENTS

| 4,403,211 A | * | 9/1983 | Shibata | ..................... B62J 6/003 340/476 |
| 4,564,833 A | * | 1/1986 | Seko | ..................... B60K 28/066 180/272 |
| 4,644,318 A | * | 2/1987 | Miyamaru | ............... B60Q 1/40 340/476 |

(Continued)

FOREIGN PATENT DOCUMENTS

GB   2468192 A       9/2010
JP   62231846 A  * 10/1987

(Continued)

OTHER PUBLICATIONS

Apr. 16, 2015—(PCT) International Preliminary Report on Patentability—App PCT/JP2013/076145.

(Continued)

*Primary Examiner* — Hai Phan
*Assistant Examiner* — Anthony D Afrifa-Kyei
(74) *Attorney, Agent, or Firm* — Banner & Witcoff, Ltd.

(57) ABSTRACT

This turn cancel signal output device is provided with: a steering angle detection unit; a first cancel pulse generation unit which, based on the steering angle detected by the steering angle detection unit, generates a first cancel pulse when the steering angle becomes a steering angle to be detected as an edge indicating the completion of a turn of a vehicle; a second cancel pulse generation unit which, based on the steering angle detected by the steering angle detection unit, generates a second cancel pulse indicating the direction of rotation of steering: and signal output terminals.

9 Claims, 11 Drawing Sheets

(56) References Cited

U.S. PATENT DOCUMENTS

| | | | |
|---|---|---|---|
| 4,860,601 A * | 8/1989 | Shibata | B60Q 1/40 73/865.8 |
| 8,632,229 B2 | 1/2014 | Yamazaki et al. | |
| 9,041,526 B2 | 5/2015 | Nishimura | |
| 2010/0156621 A1 | 6/2010 | Nishimura | |
| 2010/0219051 A1* | 9/2010 | Shimizu | B60Q 1/42 200/61.27 |
| 2011/0063860 A1 | 3/2011 | Yamazaki et al. | |

FOREIGN PATENT DOCUMENTS

| JP | S62-231846 A | 10/1987 |
|---|---|---|
| JP | S62-234748 A | 10/1987 |
| JP | H06-227330 A | 8/1994 |
| JP | 2003-237461 A | 8/2003 |
| JP | 2005-035343 A | 2/2005 |
| JP | 2010-018245 A | 1/2010 |
| JP | 2010018245 A * | 1/2010 |
| JP | 2010-143391 A | 7/2010 |
| JP | 2011-057160 A | 3/2011 |
| JP | 2011-088480 A | 5/2011 |
| JP | 2011-131631 A | 7/2011 |

OTHER PUBLICATIONS

Nov. 5, 2013—International Search Report—Intl App PCT/JP2013/076145.

Sep. 30, 2016—(JP) Notification of Reasons for Refusal—App 2012-223495.

Dec. 12, 2016—(EP) Extended Search Report—App 13843785.0.

\* cited by examiner

TURN CANCEL SIGNAL OUTPUT DEVICE FOR VEHICLE

CROSS REFERENCE TO RELATED APPLICATIONS

This application is a continuation of PCT application No. PCT/JP2013/076145, which was filed on Sep. 26, 2013 based on Japanese Patent Application (No. 2012-223495) filed on Oct. 5, 2012, the contents of which are incorporated herein by reference.

BACKGROUND OF THE INVENTION

1. Field of the Invention

One or more embodiments of the present invention relate to a turn cancel signal output device for a vehicle which provides a trigger for cancelling the operating state of a direction indicator mounted on the vehicle based on the operation state of the steering wheel of the vehicle.

2. Description of the Related Art

For example, when a vehicle moves to adjacent another traveling lane on a road having plural traveling lanes (hereinafter, the changing of the traveling lanes of a vehicle will be called as lane change) or when a vehicle turns right or left at an intersection to change a course (hereinafter, the changing of the course of a vehicle to right or left will be called as turn), it is necessary to make a sign of direction indication so that drivers of other vehicles can recognize it.

In order to make such the sign of direction indication, a vehicle is provided with turn signal lamps as direction indicators (blinkers). Further, when a driver operates an operation lever provided near the steering wheel of a vehicle, the turn signal lamps disposed on the right side or the left side can be blinked.

In the case of the lane change, it is necessary to blink the turn signal lamps for several seconds before changing lanes so that drivers of other vehicles can recognize it. Further, in the case of the turn, it is necessary to maintain the blinking of the turn signal lamps until the completion of the turn.

In general vehicles, the operation lever for operating the direction indicators has operation positions of two stages. For example, when a driver applies a force to the operation lever to thereby slightly incline the lever (position of first stage), the turn signal lamps blink while the force is applied to thereby hold the lever at this stage. In other words, when the force applied in order to hold the lever is released, the lever restores to a predetermined neutral position due to a spring force and then the blinking operation of the turn signal lamps terminates.

On the other hand, when a driver applies a force to the operation lever to thereby largely incline the lever (position of second stage), the position of the lever is mechanically held. Thus, the turn signal lamps are maintained in the blinking state even when the force applied to the lever is released. Further, since a mechanism for mechanically detecting the steering state of the steering wheel is provided, the holding of the operation lever is automatically released when the steering operation is terminated.

Accordingly, in the usual driving, the position of the first stage of the operation lever is used in the case of the lane change, whilst the position of the second stage of the operation lever is used in the case of right turn or left turn. By using the position of the second stage, since it is not necessary to continuously apply a force for holding the operation lever during the driving operation of the right turn and left turn accompanying the rotating operation of the steering wheel, the driving operation can be facilitated. Further, when the right turn or the left turn terminates, the termination state thereof is mechanically detected and the operation lever automatically restores to the neutral position. Thus, a driver is not required to perform a particular operation for terminating the blinking of the turn signal lamps.

As such the device for controlling the blinking of turn signal lamps, there have been known electronic control devices each employing a sensor for detecting a steering angle, as disclosed in JP-A-2005-35343, JP-A-2011-88480, and JP-A-2011-131631, for example.

JP-A-2005-35343 discloses a technique in which a lever switch of an automatic restoration type and a steering angle sensor for detecting the rotational direction and the angle of a steering wheel are connected to control means, and the control means outputs a predetermined turn signal based on the operation signal of the lever switch. Further, JP-A-2005-35343 discloses a technique that turn signal lamps are blinked by the turn signal, the steering angle sensor detects the rotational position of the steering wheel, and the outputting of the turn signal is stopped to thereby turn-off the turn signal lamps in a straight travelling position.

JP-A-2011-88480 discloses a technique for automatically turning-off turn signal lamps at a more suitable timing at the time of changing traveling lanes. To be concrete, the turn signal lighting control device of JP-A-2011-88480 mounts a yaw rate sensor and a steering angle sensor. In a case where the initial speed is in a high speed range, this device determines a turning-off condition based on a yaw rate detection signal which is high in the reliability of the detection result in a high speed traveling. On the other hand, in a case where the initial speed is in a low speed range, this device determines the turning-off condition based on a steering angle detection signal which is high in the reliability of the detection result in a low speed traveling.

JP-A-2011-131631 discloses a technique for preventing the erroneous turning-off of turn signal lamps at the time of right turn and left turn. To be concrete, the turn signal lighting control device of JP-A-2011-131631 proposes the switching of a turning-off condition by automatically distinguishing the right/left turning and the traveling lane change based on whether or not the steering angle of a steering angle sensor reaches a cancel preparation angle.

SUMMARY OF THE INVENTION

As disclosed in JP-A-2005-35343, JP-A-2011-88480, and JP-A-2011-131631, it has been known that an electronic control unit (ECU) for controlling the turn signal lamps discriminates the condition for turning-off the lamps (turn cancel) using the steering angle sensor for detecting the rotation angle of the steering wheel.

In general, such the electronic control unit (ECU) is required to implement various controls in addition to the blinking/turning-off of the turn signal lamps. However, in order to discriminate the turn cancel condition with high accuracy, it is necessary to frequently monitor at a short time period the steering angle detected by the steering angle sensor and to frequently repeat the comparison of the condition. Thus, in a case where the condition for discriminating the turn cancel is complicated, since a load of the electronic control unit (ECU) concerning the control of the turn signal lamps increases, the electronic control unit is placed in a situation that not all the processing can be performed within a predetermined time period. Accordingly, since the electronic control unit (ECU) is required to mount a computer with high performance, large cost increase is inevitable.

The following problem arises in the discrimination of the turn cancel condition, for example.

In a case of a large-sized vehicle such as a truck or a bus, the rotatable range of the steering wheel is several revolutions. Thus, at the time of discriminating the absolute angle detected by the steering angle sensor only within a range from 0 to 360 degrees, the state coinciding with the condition appears n-times while the steering wheel rotates n revolutions (rotation of n×360 degrees) according to the right turn or the left turn of the vehicle. As a result, the turn signal is detected at a timing not desired by a driver (despite that the vehicle is on the way of turn), whereby the turn signal lamps are turned off undesirably.

Further, in a case of a large-sized vehicle such as a truck or a bus, the entire length of the vehicle body is long. Thus, when the vehicle turns left at an intersection of a narrow road (in a case where the vehicle travels on the left side of the road), the driving operation is required to be performed in a manner that the vehicle is firstly steered to the right side slightly and then largely steered to the left side to thereby perform left turn. In such the case, if the condition for discriminating the turn cancel is improper, the turn cancel is detected when the steering wheel is restored to the position near the neutral in order to steer to the left side after steering to the right side (at the time of starting the left turn). Thus, the turn signal lamps are turned off undesirably.

The relation between the rotation angle of the steering wheel and the steering angle of wheels differs between a general passenger car and a large-sized vehicle. Further, the suitable condition for discriminating the turn cancel may also differ according to the type of vehicle. As a result, the electronic control unit (ECU) for controlling the turn signal lamps can not be used commonly among various types of vehicles. Due to such the problem and restriction, the cost reduction of the electronic control unit (ECU) is difficult.

An embodiment of this invention has been developed in view of the aforesaid circumstances and an object of the embodiment is to provide a turn cancel signal output device for a vehicle which can simplify processing for recognizing suitable turn cancel to be performed by an electronic control unit (ECU) as a host device for controlling turn signal lamps etc. and also is useful in order to detect turn cancel at a suitable timing in various types of vehicles.

In order to attain the aforesaid object, the turn cancel signal output device for a vehicle according to the embodiment is characterized by the following features [1] to [7].

[1] A turn cancel signal output device for a vehicle which provides a trigger for cancelling an operating state of a direction indicator mounted on the vehicle based on an operation state of a steering wheel of the vehicle, the turn cancel signal output device including:
  a steering angle detection part which detects a steering angle of the steering wheel;
  a first cancel pulse generation part which generates a first cancel pulse when the steering angle reaches a value to be detected as an edge representing termination of turn of the vehicle, based on the steering angle detected by the steering angle detection part;
  a second cancel pulse generation part which generates a second cancel pulse representing a rotational direction of the steering wheel, based on the steering angle detected by the steering angle detection part; and
  a signal output part which outputs a signal reflecting a state of at least one of the first cancel pulse and the second cancel pulse.

[2] The turn cancel signal output device for a vehicle configured according to [1], further including
  a nonvolatile memory which holds information of at least one of parameters defining a condition for generating the first cancel pulse.

[3] The turn cancel signal output device for a vehicle configured according to [2], wherein
  the nonvolatile memory holds a first parameter representing a reference value of the steering angle for generating the first cancel pulse and a second parameter representing a fine angle for providing hysteresis in a generation operation of the first cancel pulse, and
  the first cancel pulse generation part generates the first cancel pulse according to a result of comparison between a threshold value determined by the first parameter and the second parameter and the steering angle detected by the steering angle detection part.

[4] The turn cancel signal output device for a vehicle configured according to [3], wherein
  the nonvolatile memory holds, as a third parameter, cancel timing information representing whether or not output of plural pulses are to be allowed when the rotation angle of the steering wheel exceeds 360 degrees, and
  the first cancel pulse generation part generates the first cancel pulse according to a result of comparison between a threshold value determined by the first parameter, the second parameter and the third parameter and the steering angle detected by the steering angle detection part.

[5] The turn cancel signal output device for a vehicle configured according to [2], further including:
  a data communication part which can perform data communication with an external device; and
  a data update control part which rewrites contents of the parameters held in the nonvolatile memory based on data received by the data communication part.

[6] The turn cancel signal output device for a vehicle configured according to [1], further including
  a self-diagnosis control part which self-diagnoses an operation state, wherein
  the self-diagnosis control part inhibits output of the first cancel pulse and the second cancel pulse when a predetermined invalid state is detected.

[7] The turn cancel signal output device for a vehicle configured according to [1], further including:
  a turn signal input part which accepts input of respective turn signals representing indication of right turn and left turn of the direction indicator; and
  a third cancel pulse generation part which generates a third cancel pulse based on the turn signals, the first cancel pulse and the second cancel pulse and outputs the third cancel pulse to an external device.

According to the turn cancel signal output device for a vehicle configured according to [1], a special signal more suitable for discriminating the turn cancel than the signal of the steering angle can be outputted from the signal output part. Thus, the electronic control unit (ECU) as the host device can easily detect the state of turn cancel with a simple processing by referring to the special signal. In particular, since the first cancel pulse is generated only when the edge representing the termination of turn of the vehicle is detected, the host device is merely required to discriminate whether or not the condition is satisfied only when the first cancel pulse is outputted. Thus, it is not necessary to always monitor the signal.

According to the turn cancel signal output device for a vehicle configured according to [2], the condition for detecting the turn cancel can be determined by the parameters held in the nonvolatile memory. Thus, suitable processing can be performed according to the difference of the type of a vehicle, for example, by merely changing the parameters.

According to the turn cancel signal output device for a vehicle configured according to [3], the hysteresis characteristic can be provided in the operation for generating the first cancel pulse. Further, the second parameter determining the hysteresis characteristic can be suitably adjusted according to the difference of the type of a vehicle, for example.

According to the turn cancel signal output device for a vehicle configured according to [4], the determination can be made according to the third parameter as to whether or not the first cancel pulse is to be generated each time the steering wheel rotates one revolution. Thus, the first cancel pulse can be generated at a suitable timing according to the difference of the type of a vehicle, for example.

According to the turn cancel signal output device for a vehicle configured according to [5], the contents of the parameters held in the nonvolatile memory can be rewritten as the need arises. Thus, the operation characteristic of the turn cancel signal output device for a vehicle can be changed so as to cope with the type of a vehicle, for example, by using the electronic control unit (ECU) as the host device or a computer for maintenance of the vehicle.

According to the turn cancel signal output device for a vehicle configured according to [6], the output of the first cancel pulse and the second cancel pulse is inhibited when any failure occurs. Thus, adverse effect such as a malfunction on the vehicle side due to the failure can be suppressed to the minimum.

According to the turn cancel signal output device for a vehicle configured according to [7], the number of the signals to be outputted can be made minimum and the processing for discriminating the turn cancel performed on the electronic control unit (ECU) side as the host device can be further simplified.

The turn cancel signal output device for a vehicle according to the embodiment can be used in place of a steering angle sensor of the related art. By using this turn cancel signal output device for a vehicle, the electronic control unit (ECU) as the host device for controlling the turn signal lamps etc. can suitably recognize the turn cancel by the simple processing. Further, the configuration and the operation of the electronic control unit (ECU) as the host device can be made common to various types of vehicles.

The invention is described above briefly. Further, the detail of the invention will be made clearer by thoroughly reading the mode carrying out the invention (hereinafter referred to "embodiment") explained below with reference to attached drawings.

DETAILED DESCRIPTION OF THE EXEMPLARY EMBODIMENTS

A concrete embodiment concerning a turn cancel signal output device for a vehicle according to the invention will be explained hereinafter with reference to FIGS. 1 to 11.

<Summary of Turn Cancel Signal Output Device for Vehicle>

Figure 2:
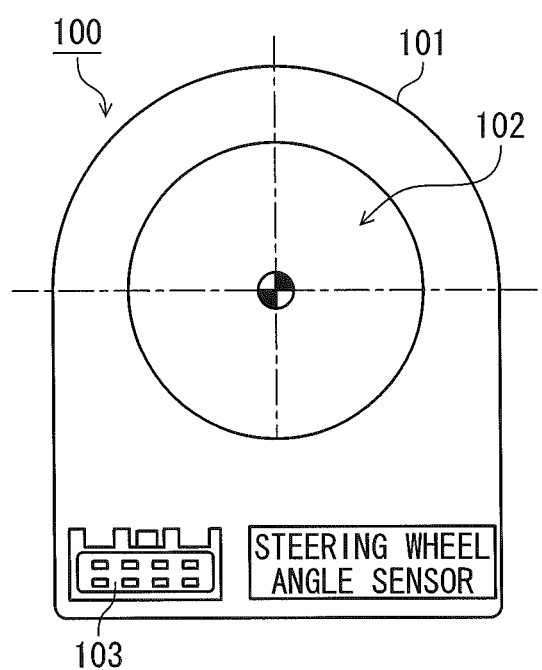
FIG. 2 is a front view showing the external appearance of the turn cancel signal output device.

The turn cancel signal output device for a vehicle according to the embodiment is constituted integrally as shown in FIG. 2 so as to be usable in place of a general steering angle sensor for steering to be mounted on a vehicle.

The turn cancel signal output device for a vehicle can also output information of a steering angle like the general steering angle sensor. Further, the turn cancel signal output device mounts a function of outputting special turn cancel signals (corresponding to C/P-1 and C/P-2 in FIG. 1) in addition to the steering angle.

In a vehicle, when a driver operates a predetermined operation lever disposed near a steering wheel (handle), a turn signal for right-turn, left-turn or lane change etc. of the vehicle is generated. An electronic control unit (ECU) on a vehicle blinks the turn signal lamps of direction indicators in accordance with the turn signal.

In a case of changing lanes, the turn signal is cancelled when a driver releases a force applied to the operation lever, whereby the blinking of the turn signal lamps terminates in response to the cancellation as a trigger. On the other hand, in a case of turning right or left, the turn signal lamps are required to maintain a blinking state until the turning of a vehicle actually terminates. To this end, the turn signal is self-held in an on state even when a driver releases the force applied to the operation lever.

Thus, in a case of turning right or left, it is required to automatically recognize the termination state of the turning of a vehicle to thereby terminate the blinking of the turn signal lamps. The electronic control unit (ECU) can automatically discriminate the termination state of the turning of a vehicle by monitoring the steering angle information detected by the sensor.

However, in a case of employing the turn cancel signal output device for a vehicle according to the embodiment, the electronic control unit (ECU) can detect the termination state of the turning of a vehicle based on turn cancel signals with a quite simple processing as compared with the case of monitoring the steering angle.

<Explanation of Functional Main Configuration>

Figure 1:
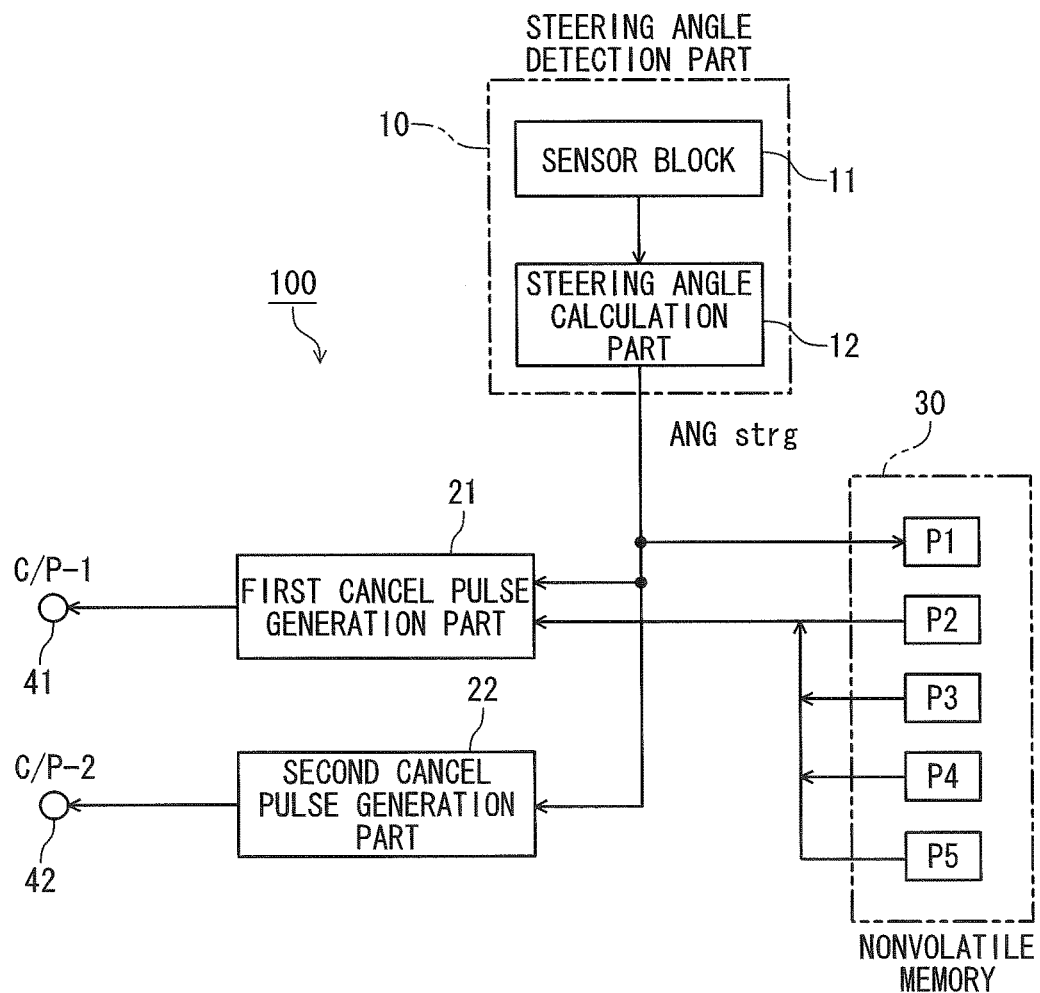
FIG. 1 is a block diagram showing functional configuration relating to the main portion of a turn cancel signal output device.

FIG. 1 shows the functional configuration relating to the main portion of the turn cancel signal output device 100.

The turn cancel signal output device 100 includes a steering angle detection part 10, a first cancel pulse generation part 21, a second cancel pulse generation part 22, a nonvolatile memory 30 and output terminals 41, 42.

The steering angle detection part 10 is configured by a sensor block 11 and a steering angle calculation part 12. The sensor block 11 is arranged to detect the rotational position of the steering rotating shaft of a vehicle as a detection subject and hence can detect a rotation angle. That is, the sensor block 11 can detect the rotation angle of a steering wheel with respect to a neutral state thereof. The technique similar to the conventional steering angle sensor on the market is utilized as the detection theory of the sensor block 11.

The steering angle calculation part 12 can sequentially output information of newest steering angle ANGstrg ([°]) by performing a calculation processing as to an electric signal outputted from the sensor block 11.

The first cancel pulse generation part 21 has a function of generating a first cancel pulse C/P-1 based on the steering angle ANGstrg outputted from the steering angle detection part 10 and respective parameters P2 to P5 held in the nonvolatile memory 30. The first cancel pulse C/P-1 represents whether or not the steering angle reaches a value to be detected as an edge showing the termination of turn of the vehicle.

The second cancel pulse generation part 22 has a function of generating a second cancel pulse C/P-2 based on the steering angle ANGstrg outputted from the steering angle detection part 10. The second cancel pulse C/P-2 represents the rotational direction of the steering shaft.

The nonvolatile memory 30 can hold data of the following parameters P1 to P5. The contents of each of these parameters can be rewritten.

P1: range of steering angle ANGstrg detected by the steering angle detection part 10

P2: cancel edge angle

P3: hysteresis angle (quite small angle for providing hysteresis characteristic)

P4: designation of single cancel mode

P5: designation of multi-cancel mode

The first cancel pulse C/P-1 generated by the first cancel pulse generation part 21 is outputted to the output terminal 41 and the second cancel pulse C/P-2 generated by the second cancel pulse generation part 22 is outputted to the output terminal 42.

The electronic control unit (ECU) as a host device for controlling direction indicators etc. can detect the termination of turn of the vehicle with a simple processing by referring to the pulses C/P-1 and C/P-2 outputted from the output terminals 41, 42 of the turn cancel signal output device 100. When the termination of turn is detected, the electronic control unit (ECU) terminates the blinking of the turn signal lamps in response to the termination as a trigger.

<Explanation of External Appearance>

FIG. 2 shows a concrete example of the external appearance of the turn cancel signal output device 100. As shown in FIG. 2, the main body of the turn cancel signal output device 100 is disposed within a casing 101.

The casing 101 is provided with a circular opening part 102 and a connector 103. The diameter of the opening part 102 is substantially same as the outer diameter of the rotating shaft for supporting the steering wheel of the vehicle. That is, the turn cancel signal output device 100 can be fixed to the vehicle in a state that the rotating shaft penetrates through the opening part 102 of the turn cancel signal output device 100.

The sensor block 11 shown in FIG. 1 can detect a rotational amount of the rotating shaft disposed within the opening part 102 of the turn cancel signal output device 100. The steering angle calculation part 12 calculates the rotation angle of the steering wheel based on the detected rotational amount.

As shown in FIG. 2, the connector 103 disposed on the outer side of the casing 101 is provided with many terminals. These terminals contain the output terminals 41, 42 shown in FIG. 1. That is, the electronic control unit (ECU) as the host device for controlling the direction indicators etc. can be connected to the turn cancel signal output device 100 via the connector 103 and hence can refer to the pulses C/P-1 and C/P-2.

<Explanation of Configuration of Electric Circuit>

Figure 3:
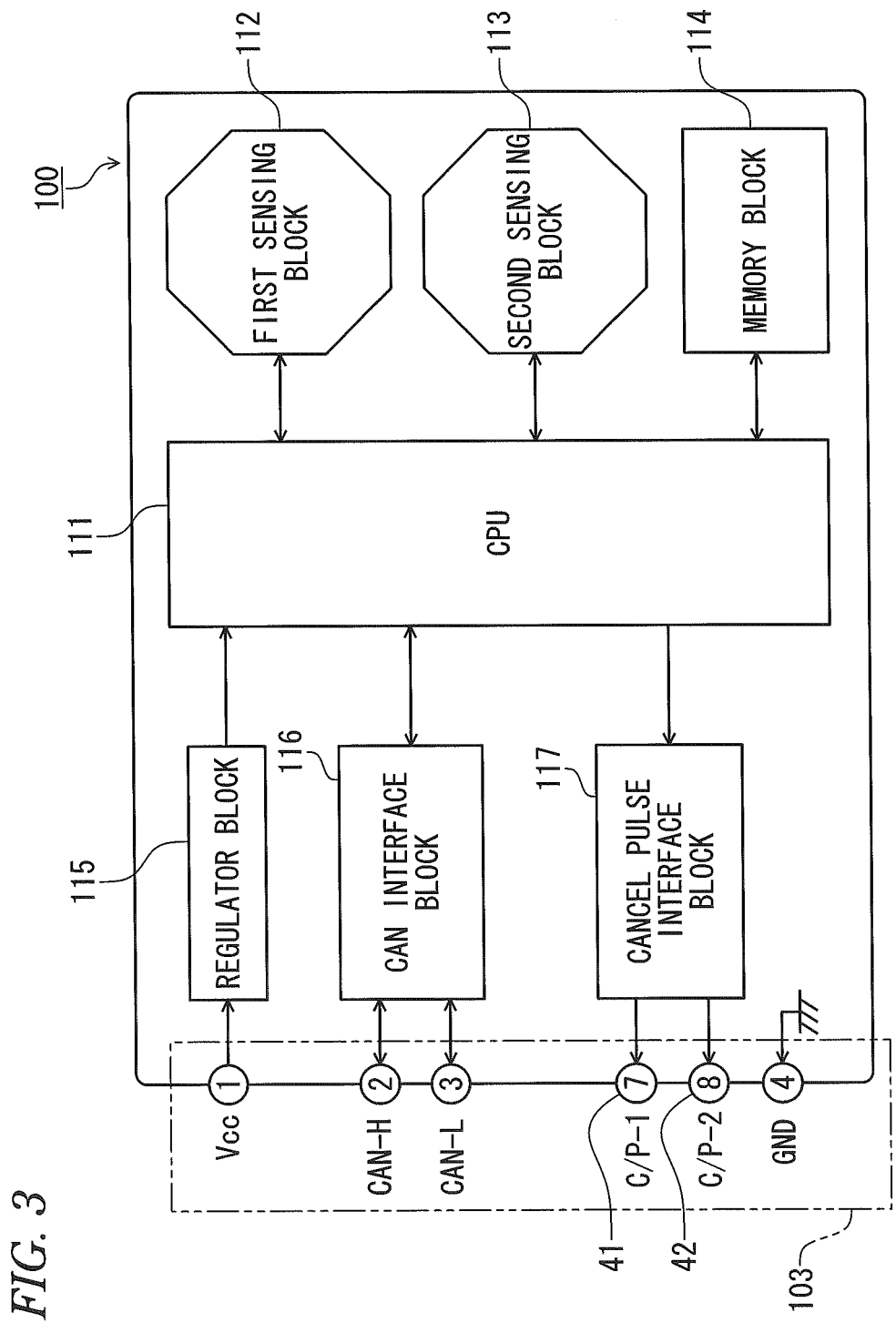
FIG. 3 is a block diagram showing the configuration of an actual electric circuit in the turn cancel signal output device shown in FIG. 2.

FIG. 3 shows the configuration of an actual electric circuit in the turn cancel signal output device 100 shown in FIG. 2. As shown in FIG. 3, the turn cancel signal output device 100 includes respective blocks 111 to 117 explained below as hardware.

A microcomputer (CPU) 111 executes program stored therein in advance to thereby perform processing for realizing various functions necessary for the turn cancel signal output device 100. For example, the respective functions of the steering angle calculation part 12, the first cancel pulse generation part 21 and the second cancel pulse generation part 22 shown in FIG. 1 are realized by the microcomputer 111. Of course, these functions may be realized by providing a dedicated hardware other than the microcomputer.

A first sensing block 112 and a second sensing block 113 correspond to the sensor block 11 shown in FIG. 1 and can detect the rotational amount or the rotation angle of the steering wheel. That is, the first sensing block 112 and the second sensing block 113 detect the rotational amount or the rotation angle of the rotating shaft disposed within the opening part 102 shown in FIG. 2.

A memory block 114 is a nonvolatile memory which is capable of reading and rewriting data and configured by an EEPROM, for example. The memory block 114 can hold data such as constants and programs executed by the microcomputer 111. The memory block 114 includes the function of the nonvolatile memory 30 in FIG. 1.

A regulator block 115 converts a DC power supplied to the power supply lines (Vcc, GND) of the connector 103 from the vehicle side into a stable DC power and supplies the DC power to respective circuit elements such as the microcomputer 111.

A CAN interface block 116 performs a signal processing according to the communication standard of CAN (Controller Area Network) to enable communication connection between the communication network (CAN) on the vehicle and the turn cancel signal output device 100. The CAN interface block 116 is connected to the communication network (CAN) on the vehicle via signal lines (CAN-H, CAN-L) provided as the terminals of the connector 103. Thus, various electronic control units (ECUs) on the vehicle can access the turn cancel signal output device 100 via the communication network on the vehicle.

A cancel pulse interface block 117 performs a signal processing for outputting the first cancel pulse C/P-1 and the second cancel pulse C/P-2 as signals of prescribed signal levels. The functions of the first cancel pulse generation part 21 and the second cancel pulse generation part 22 shown in FIG. 1 can also be incorporated within the cancel pulse interface block 117 as an exclusive hardware.

<Explanation of Concrete Operation of Turn Cancel Signal Output Device 100>
<Generation Operation of C/P-1>

Figure 4:
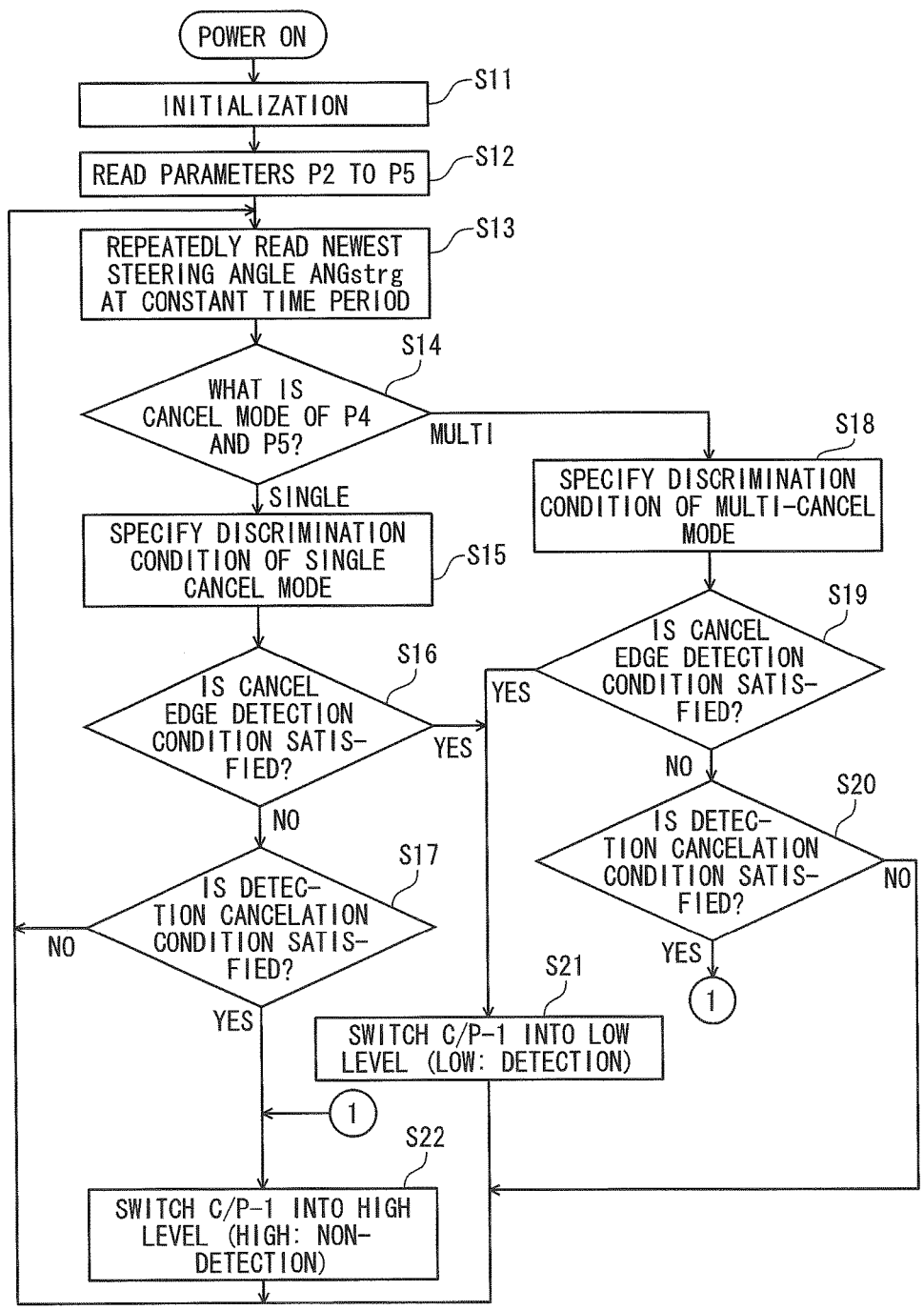
FIG. 4 is a flowchart showing an operation for generating a first cancel pulse C/P-1.

An operation for generating the first cancel pulse C/P-1 is shown in FIG. 4. That is, when the microcomputer 111 shown in FIG. 3 executes a processing shown in FIG. 4, the function of the first cancel pulse generation part 21 shown in FIG. 1 is realized, whereby the first cancel pulse C/P-1 is generated. The operation shown in FIG. 4 will be explained.

When the power supply is turned on, the microcomputer 111 executes a predetermined initialization in step S11 and then reads data of the parameters P2 to P5 from the nonvolatile memory 30 in the next step S12.

In step S13, the microcomputer 111 periodically reads information of newest steering angle ANGstrg from the output of the steering angle detection part 10 or as data on the memory block 114.

In step S14, the microcomputer 111 discriminates whether a turn cancel mode currently designated is the single cancel mode or the multi-cancel mode with reference to the parameters P4, P5 read in step S12. In the case of the single cancel mode, the processing proceeds to step S15. In contrast, in the case of the multi-cancel mode, the processing proceeds to step S18.

In step S15, the microcomputer 111 specifies the discrimination condition of C/P-1 in the single cancel mode as follows.

Condition for switching C/P-1 into a low level (Low) (cancel edge detection condition): |ANGstrg|≤P2

Condition for switching C/P-1 into a high level (High) (detection cancellation condition): |ANGstrg|≥(P2+P3)

Condition for maintaining the level of C/P-1: in a case of not falling under any of the aforesaid conditions In step S16, the microcomputer 111 discriminates whether or not the cancel edge detection condition specified in step S15 is satisfied. In the case of satisfying the condition, the processing proceeds to step S21. In contrast, in the case of not satisfying the condition, the processing proceeds to step S17.

In step S17, the microcomputer 111 discriminates whether or not the detection cancellation condition specified in step S15 is satisfied. In the case of satisfying the condition, the processing proceeds to step S22. In contrast, in the case of not satisfying the condition, the processing proceeds to step S13.

In step S18, the microcomputer 111 specifies the discrimination condition of C/P-1 in the multi-cancel mode as follows:

Condition for switching C/P-1 into the low level (Low) (cancel edge detection condition): (|ANGstrg|−360×n)≤P2

Condition for switching C/P-1 into the high level (High) (detection cancellation condition): (|ANGstrg|−360×n)≥(P2+P3)

Condition for maintaining the level of C/P-1: in a case of not falling under any of the aforesaid conditions where the value of n is as follows:
in a case of |ANGstrg|≥540 [°]: n=2
in a case of |ANGstrg|≥180 [°]: n=1
in a case of |ANGstrg|<180 [°]: n=0.

In step S19, the microcomputer 111 discriminates whether or not the cancel edge detection condition specified in step S18 is satisfied. In the case of satisfying the condition, the processing proceeds to step S21. In contrast, in the case of not satisfying the condition, the processing proceeds to step S20.

In step S20, the microcomputer 111 discriminates whether or not the detection cancellation condition specified in step S18 is satisfied. In the case of satisfying the condition, the processing proceeds to step S22. In contrast, in the case of not satisfying the condition, the processing proceeds to step S13.

In step S21, the microcomputer 111 switches the voltage of the first cancel pulse C/P-1 to be outputted into the low level (Low: voltage close to GND, for example).

In step S22 the microcomputer 111 switches the voltage of the first cancel pulse C/P-1 to be outputted into the high level (High: voltage close to Vcc, for example).

In a case of not executing any of steps S21 and S22, the voltage of the first cancel pulse C/P-1 is kept to a voltage same as the previous value.

<Generation Operation of C/P-2>

Figure 5:
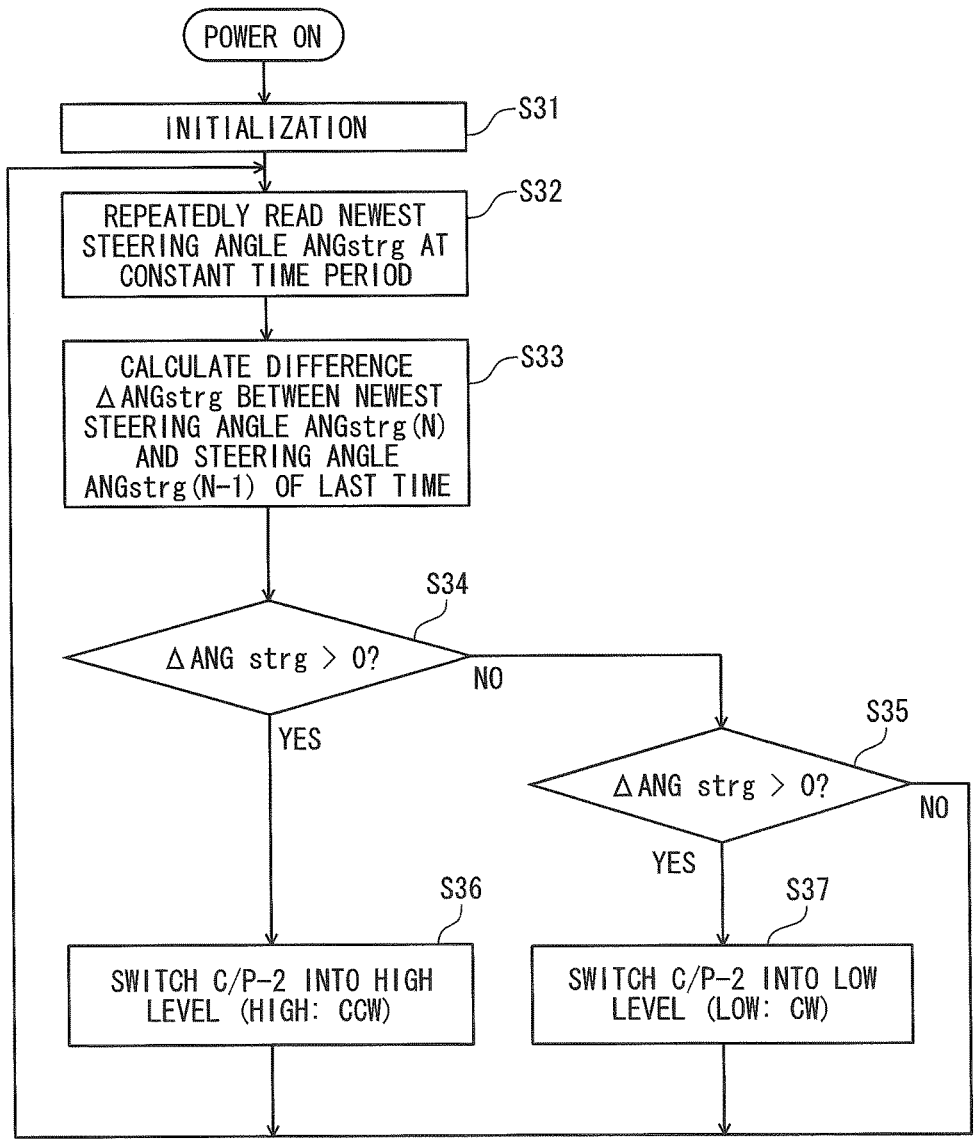
FIG. 5 is a flowchart showing an operation for generating a second cancel pulse C/P-2.

An operation for generating the second cancel pulse C/P-2 is shown in FIG. 5. That is, when the microcomputer 111 shown in FIG. 3 executes a processing shown in FIG. 5, the function of the second cancel pulse generation part 22 shown in FIG. 1 is realized, whereby the second cancel pulse C/P-2 is generated. The operation shown in FIG. 5 will be explained.

When the power supply is turned on, the microcomputer 111 executes the predetermined initialization in step S31 and then proceeds to the next step S32.

In step S32, the microcomputer 111 periodically reads information of newest steering angle ANGstrg from the output of the steering angle detection part 10 or as data on the memory block 114. Further, the microcomputer temporarily holds information of steering angles ANGstrg obtained by previous two reading processings in a manner that the newest steering angle read in the N-th processing is held as ANGstrg (N) and the steering angle read in the (N−1)-th processing just before the N-th processing is held as ANGstrg(N−1).

In step S33, the microcomputer 111 performs the following calculation using the steering angle information obtained by the past two reading processings in step S32 to obtain a steering angle difference (change value) ΔANGstrg.

$$\Delta \text{ANGstrg} = \text{ANGstrg}(N) - \text{ANGstrg}(N-1)$$

In step S34, the microcomputer 111 discriminates whether or not the condition "ΔANGstrg>0" is satisfied. The processing proceeds to step S36 when this condition is satisfied, whilst the processing proceeds to step S35 when this condition is not satisfied.

In step S35, the microcomputer 111 discriminates whether or not the condition "ΔANGstrg<0" is satisfied. The processing proceeds to step S37 when this condition is satisfied, whilst the processing proceeds to step S32 when this condition is not satisfied.

In step S36, the microcomputer 111 switches the voltage of the second cancel pulse C/P-2 into the high level (High: voltage close to Vcc, for example). This state represents that the rotational direction of the steering shaft is counter clockwise (CCW).

In step S37, the microcomputer 111 switches the voltage of the second cancel pulse C/P-2 into the low level (Low:

voltage close to GND, for example). This state represents that the rotational direction of the steering shaft is clockwise (CW).

<Concrete Examples of Operation Characteristic>

Figure 6:
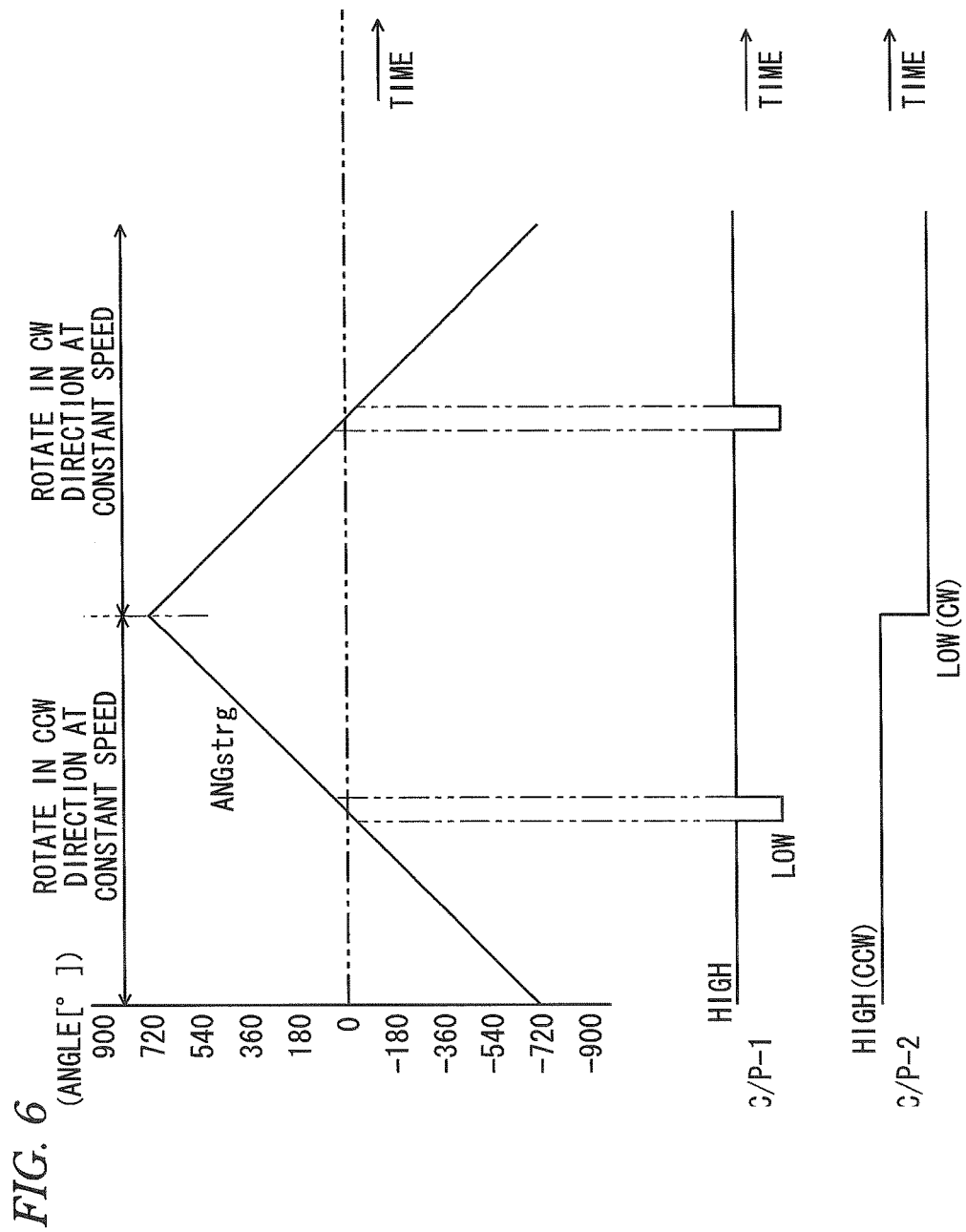
FIG. 6 is a timing chart representing a concrete example (1) of the operation characteristic of the turn cancel signal output device.
Figure 7:
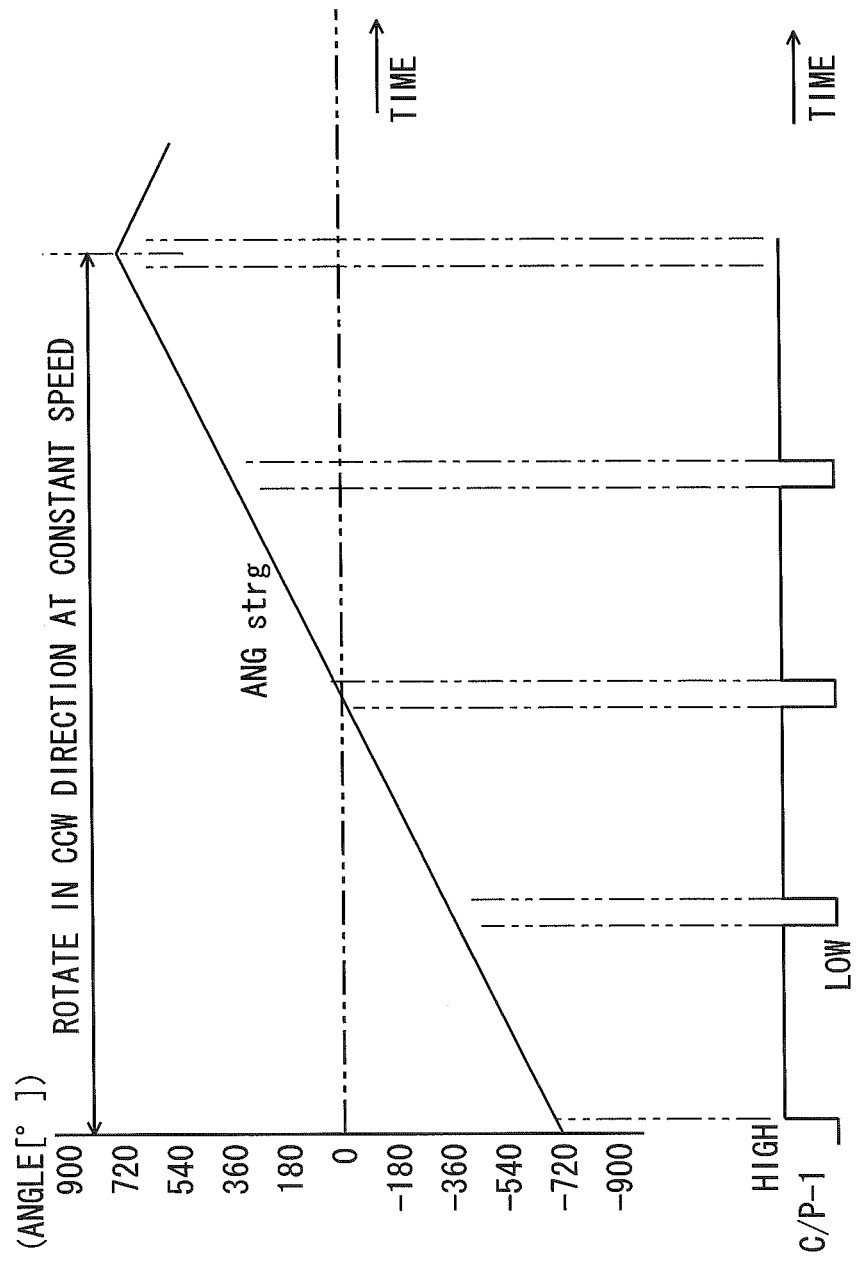
FIG. 7 is a timing chart representing a concrete example (2) of the operation characteristic of the turn cancel signal output device.
Figure 8:
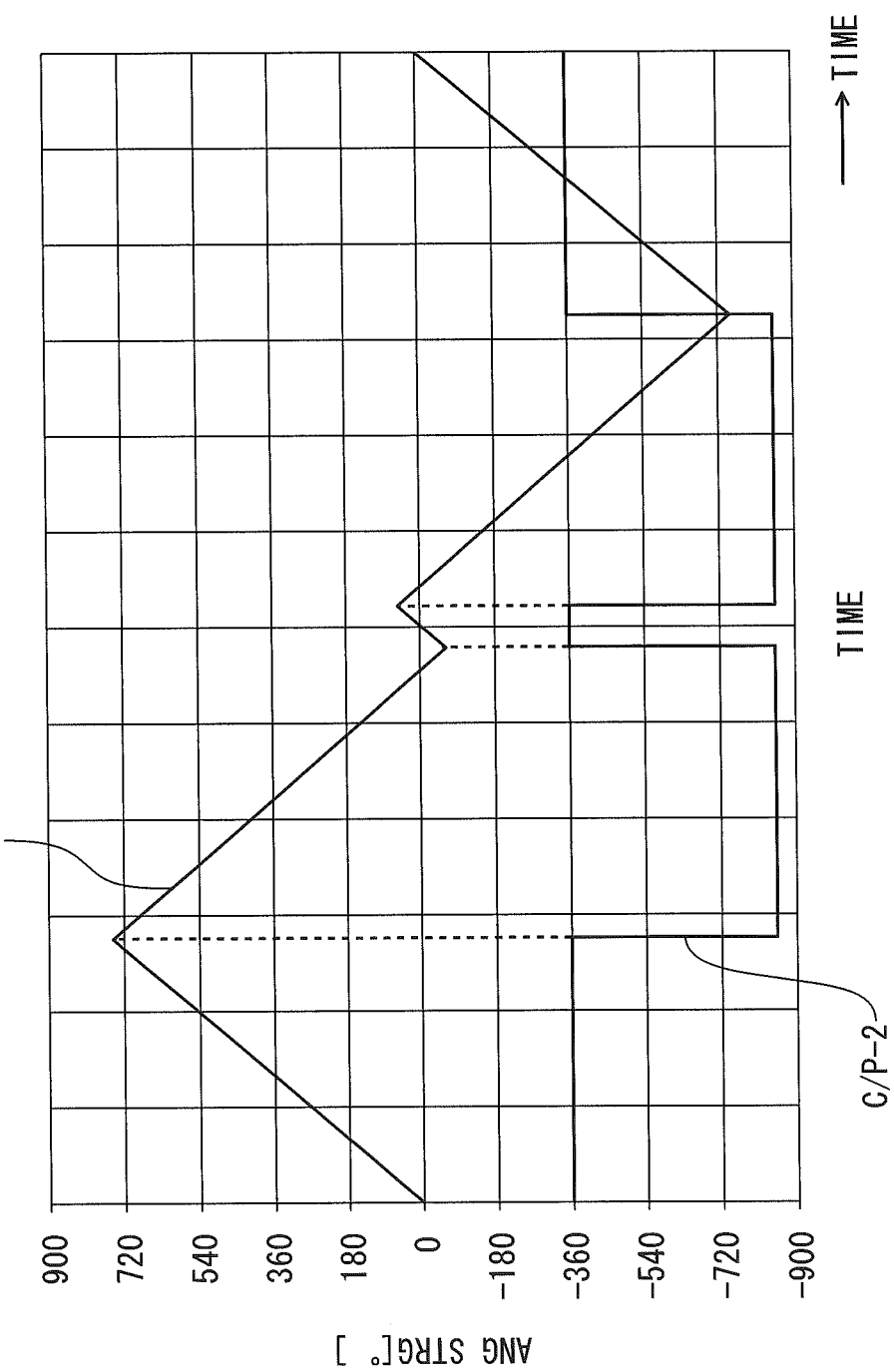
FIG. 8 is a timing chart representing a concrete example (3) of the operation characteristic of the turn cancel signal output device.

The concrete examples of the operation characteristic of the turn cancel signal output device 100 are shown in FIGS. 6, 7 and 8.

The operation characteristic shown in FIG. 6 represents a state that, in a state where the single scan mode is designated (P4 is effective), after steering in the CCW direction at a constant speed to an angle of +750 degrees from an angle of −750 degrees, the steering shaft is steered on the contrary in the CW direction at a constant speed to an angle of −750 degrees from an angle of +750 degrees. In this case, following values are used as the respective parameters.

P1: −750 to +750 [°] (angle range)
P2: 30 [°] (cancel edge angle)
P3: 2 [°] (hysteresis angle)
P4: single cancel mode As shown in FIG. 6, in the case of the single cancel mode, only a single pulse (Low section) effective as the first cancel pulse C/P-1 appears during a single steering operation in a full range from −750 degrees to +750 degrees capable of being steered.

That is, when the steering angle ANGstrg satisfies the cancel edge detection condition (|ANGstrg|≤P2) of step S16 shown in FIG. 4, C/P-1 is switched into "Low" in step S21. Immediately after this switching, when the steering angle satisfies the detection cancel condition (|ANGstrg|≥(P2+P3)) of step S17, C/P-1 is switched into "High" in step S22.

In contrast, the operation characteristic shown in FIG. 7 represents a state that, in a state where the multi-cancel mode is designated (P5 is effective), the steering shaft is steered in the CCW direction at a constant speed to an angle of +750 degrees from an angle of −750 degrees. In this case, following values are used as the respective parameters.

P1: −750 to +750 [°] (angle range)
P2: 30 [°] (cancel edge angle)
P3: 2 [°] (hysteresis angle)
P5: multi-cancel mode As shown in FIG. 7, in the case of the multi-cancel mode, when the cancel edge condition is satisfied each time the steering shaft and the steering wheel rotate one revolution (rotation of 360 degrees), a pulse (Low section) effective as the first cancel pulse C/P-1 appears.

That is, when the steering angle ANGstrg satisfies the cancel edge detection condition (|ANGstrg|−360×n|≤P2) of step S19 shown in FIG. 4, C/P-1 is switched into "Low" in step S21. Immediately after this switching, when the steering angle satisfies the detection cancel condition (|ANGstrg|−360×n|≥(P2+P3)) of step S20, C/P-1 is switched into "High" in step S22.

The operation characteristic shown in FIG. 8 represents a changing state of the second cancel pulse C/P-2 in a case that the movement of the steering wheel is changed in the rotational direction. To be concrete, the example shown in FIG. 8 supposes the following steering.

(1) Firstly, rotate in the CCW direction within a range from 0 to +750 [°] of the steering angle
(2) Next, rotate in the CW direction within a range from +750 to −60 [°] of the steering angle
(3) Next, rotate in the CCW direction within a range from −60 to +60 [°] of the steering angle
(4) Next, rotate in the CW direction within a range from +60 to −750 [°] of the steering angle
(5) Next, rotate in the CCW direction within a range from −750 to 0 [°] of the steering angle As shown in FIG. 8, the second cancel pulse C/P-2 becomes the high level (High) when the changing rotational direction of the steering angle ANGstrg is CCW, whilst the second cancel pulse changes into the low level (Low) when the changing rotational direction of the steering angle is CW. In other words, the rotational direction is regarded as (CCW) when the condition of step S34 shown in FIG. 5 is satisfied, whereby C/P-2 is switched into the high level. In contrast, the rotational direction is regarded as (CW) when the condition of step S35 is satisfied, whereby C/P-2 is switched into the low level.

<Example of Discriminating Turn Cancel Utilizing C/P-1, C/P-2>

The electronic control unit (ECU) as the host device can relatively easily discriminate the turn cancel by utilizing the two pulses C/P-1, C/P-2 outputted from the turn cancel signal output device 100. That is, the turn cancel as a trigger for terminating the blinking after starting the blinking of the turn signal lamps of the direction indicators can be discriminated based on C/P-1 and C/P-2.

To be concrete, the electronic control unit (ECU) as the host device performs the discrimination using the following conditions.

<Example of Condition for Turning-off Turn Signal Lamps for Right Direction>

Rising (Low→High) of the first cancel pulse C/P-1 is detected and the rotational direction represented by the second cancel pulse C/P-2 is CCW (High).

<Example of Condition for Turning-off Turn Signal Lamps for Left Direction>

Rising (Low→High) of the first cancel pulse C/P-1 is detected and the rotational direction represented by the second cancel pulse C/P-2 is CW (Low).

<Concrete Example of Controlling of Direction Indicator>

Figure 11:
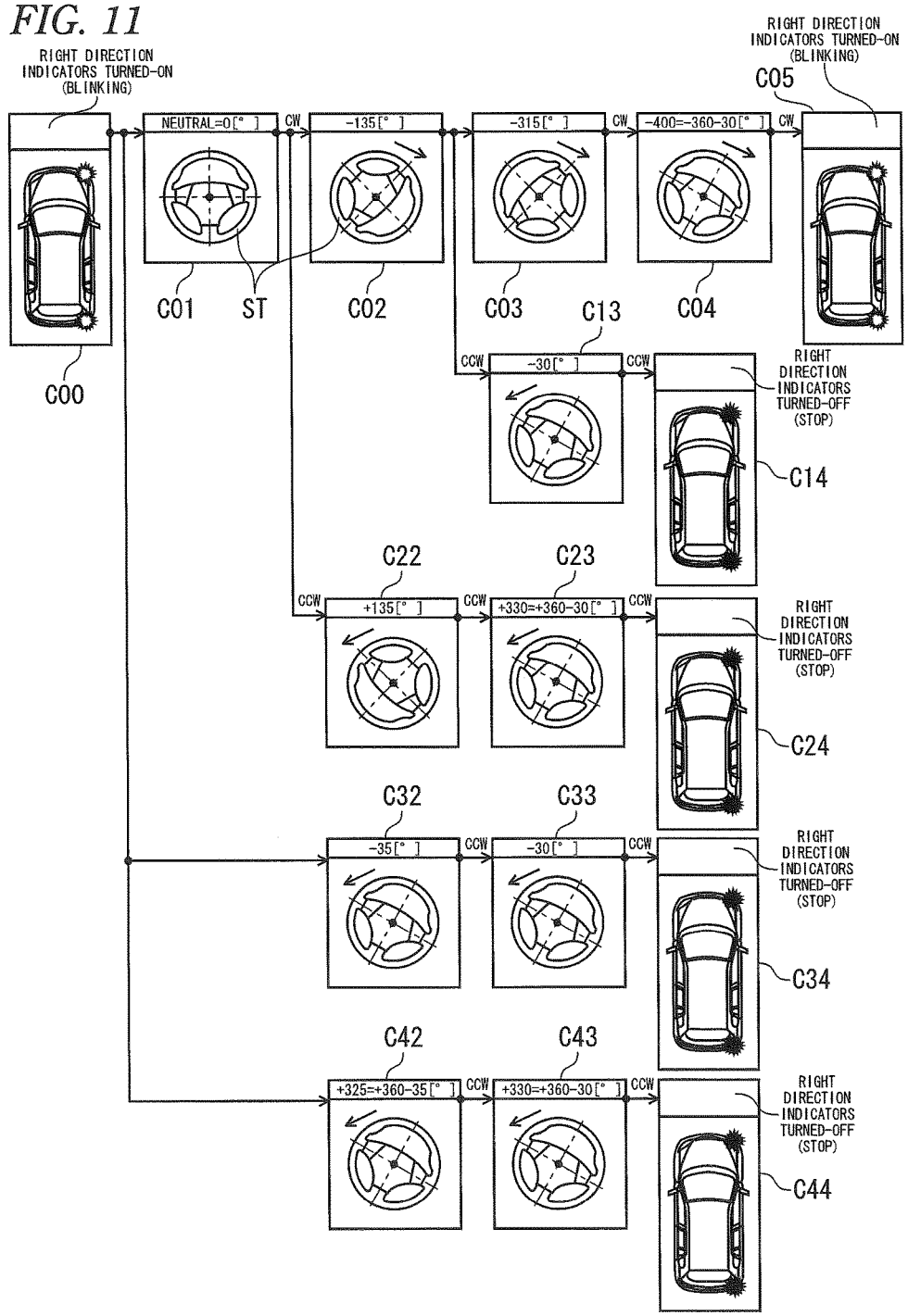
FIG. 11 is a state transition diagram showing a concrete example of the correspondence relation between the control of direction indicators and the state transition of a steering angle and a rotational direction according to the operation of a steering wheel.

FIG. 11 shows a concrete example of the correspondence relation between the control of the direction indicators and the state transition of the steering angle and the rotational direction according to the operation of the steering wheel. That is, according to the state transition due to the operation of the steering wheel, the electronic control unit (ECU) as the host device controls the turning-off of the direction indicators (turn signal lamps) as shown in FIG. 11. In the example of FIG. 11, the electronic control unit (ECU) as the host device performs the control using the aforesaid turning-off conditions. Following values are supposed as the respective parameters of the turn cancel signal output device 100.

P1: −750 to +750 [°] (angle range)
P2: 30 [°] (cancel edge angle)
P3: 2 (hysteresis angle)

Explanation will be made as to respective states and respective state transitions shown in FIG. 11.

When a driver operates the operation lever in order to turn the vehicle right, the electronic control unit (ECU) as the host device for controlling the direction indicators turns on "a right turn signal". Thus, the blinking of the right direction indicators is started. This corresponds to the first state C00 shown in FIG. 11. In this respect, it is necessary to detect the turn cancel state in order to terminate the blinking of the right direction indicators.

The electronic control unit (ECU) can discriminate the turn cancel state based on the "right turn signal" and the pulses C/P-1, C/P-2 outputted from the turn cancel signal output device 100. Actually, respective states C05, C14, C24, C34 and C44 shown in FIG. 11 are obtained as the results of the respective state transitions.

(1) As shown in FIG. 11, when the state of the steering wheel ST changes from C01 to C04 via C02 and C03 and the steering angle [°] changes in the CW direction from 0 (neutral position) to "−400" via "−135" and "−315", the turn cancel state is not detected. As a result, the blinking operation of the right direction indicators is maintained in the state C05.

(2) After the state C02, when the steering wheel ST is rotated in the CCW direction and the steering angle [°] becomes "−30" as shown in a state C13, the pulse C/P-1 appears. Thus, since the aforesaid "turning-off condition" is satisfied, the turn cancel state is detected. As a result, the right direction indicators are turned off in the state C14.

(3) In a case where the multi-cancel mode is designated, if the state of the steering wheel changes from C01 to C23 via C22 in the similar manner as above, the pulse C/P-1 also appears and hence the aforesaid "turning-off condition" is satisfied. Thus, the turn cancel state is detected. As a result, the right direction indicators are turned off in the state C24.

(4) Also in a case where the state of the steering wheel changes from C00 to C33 via C32, since the pulse C/P-1 appears and hence the aforesaid "turning-off condition" is satisfied. Thus, the turn cancel state is detected. As a result, the right direction indicators are turned off in the state C34.

(5) In a case where the multi-cancel mode is designated, also if the state of the steering wheel changes from C00 to C43 via C42, the pulse C/P-1 appears and hence the aforesaid "turning-off condition" is satisfied. Thus, the turn cancel state is detected. As a result, the right direction indicators are turned off in the state C44.

<Self-diagnosis and Parameter Rewriting>

Figure 9:
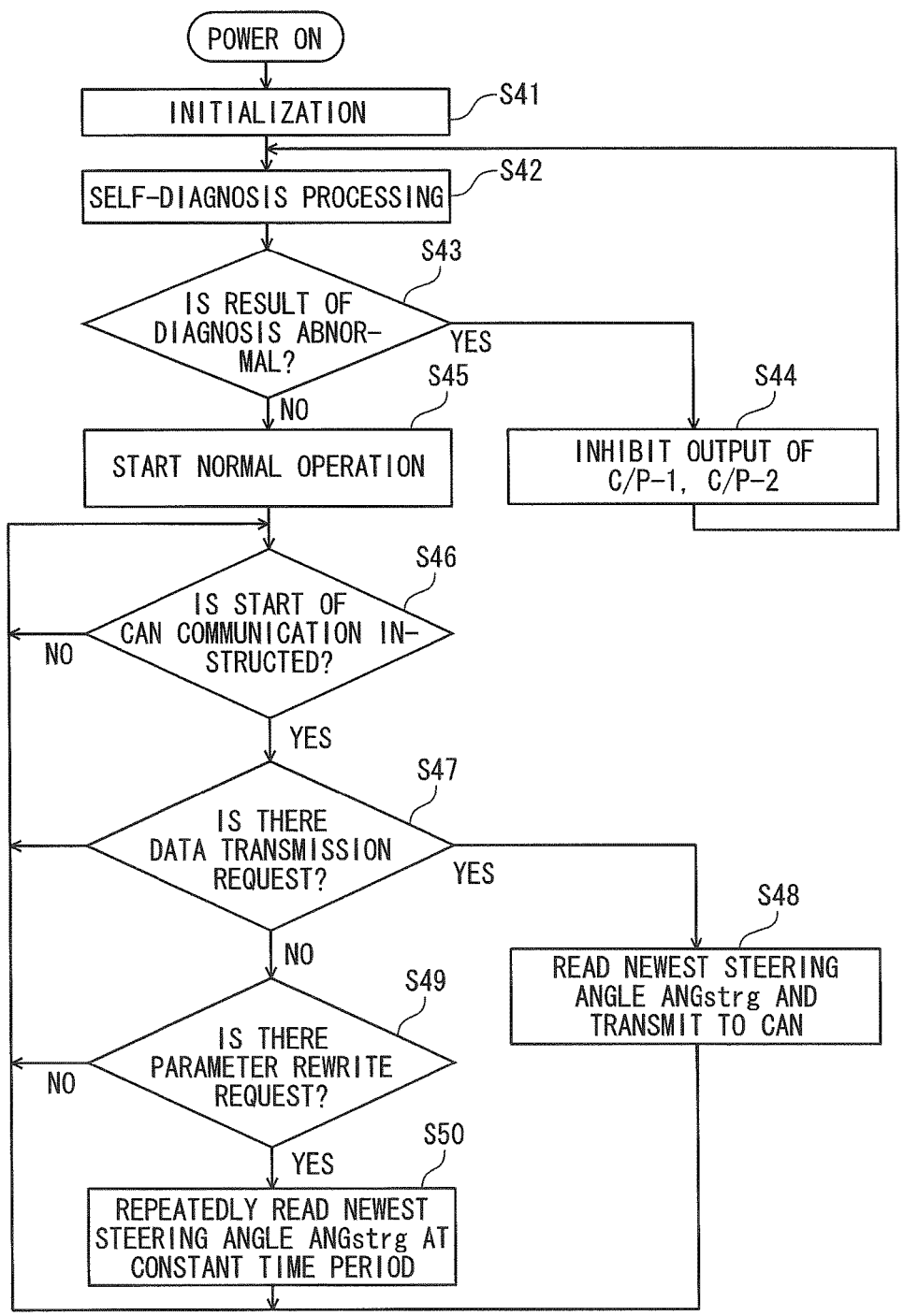
FIG. 9 is a flowchart showing an operation of self-diagnosis and parameter rewriting in the turn cancel signal output device.

FIG. 9 shows the operation of self-diagnosis and parameter rewriting in the turn cancel signal output device 100. When the microcomputer 111 (see FIG. 3) contained in the turn cancel signal output device 100 executes predetermined program, the operation of FIG. 9 is realized. Processing of respective steps in FIG. 9 will be explained.

When the power supply of the turn cancel signal output device 100 is turned on, the microcomputer 111 executes the predetermined initialization in step S41 and then proceeds to processing of step S42.

In step S42, the microcomputer 111 executes predetermined self-diagnosis processing. For example, the microcomputer 111 executes a diagnosis relating to the function of the microcomputer itself and a diagnosis relating to disconnection and abnormality of signal level etc. of the respective blocks (112, 113, 116, 117 etc.) connected to the microcomputer 111. Further, the microcomputer also executes a diagnosis as to whether or not the device is in a state capable of detecting the steering angle correctly.

In step S43, the microcomputer 111 discriminates whether or not an abnormal diagnosis result is obtained as the result of step S42. The processing proceeds to step S44 when the abnormality is detected, whilst the processing proceeds to step S45 when the abnormality is not detected.

In step S44, since the device is not in the state capable of detecting the steering angle correctly, the microcomputer 111 controls the cancel pulse interface block 117 so as to inhibit the output of the first cancel pulse C/P-1 and the second cancel pulse C/P-2 (fix each of the signal levels thereof to High).

In step S45, the microcomputer 111 starts predetermined processing so that the turn cancel signal output device 100 performs the normal operation. As a result, for example, the processing shown FIG. 4 and the processing shown FIG. 5 are executed as usual. Thus, the first cancel pulse C/P-1 and the second cancel pulse C/P-2 can be outputted.

In step S46, the microcomputer 111 monitors the state of the CAN interface block 116 to thereby discriminate whether or not CAN communication is to be started. The processing proceeds to step S47 in a case of starting the CAN communication.

In step S47, the microcomputer 111 discriminates whether or not the CAN interface block 116 receives a "data transmission request" command from another electronic control unit (ECU) connected to the communication network (CAN) on the vehicle. The processing proceeds to step S48 when the "data transmission request" is received, whist the processing proceeds to step S49 when not received.

In step S48, the microcomputer reads data of the newest steering angle ANGstrg detected by the steering angle detection part 10 and transmits this data to the communication network (CAN) on the vehicle via the CAN interface bock 116.

In step S49, the microcomputer 111 discriminates whether or not a "parameter rewrite request" command is received from another electronic control unit (ECU) connected to the communication network (CAN) on the vehicle. The processing proceeds to step S50 when the "parameter rewrite request" is received, whist the processing proceeds to step S46 when not received.

In step S50, the microcomputer 111 rewrites data of the parameters P1 to P5 held in the memory block 114 (non-volatile memory) according to the contents of the "parameter rewrite request" thus received.

<Modified Example>

Figure 10:
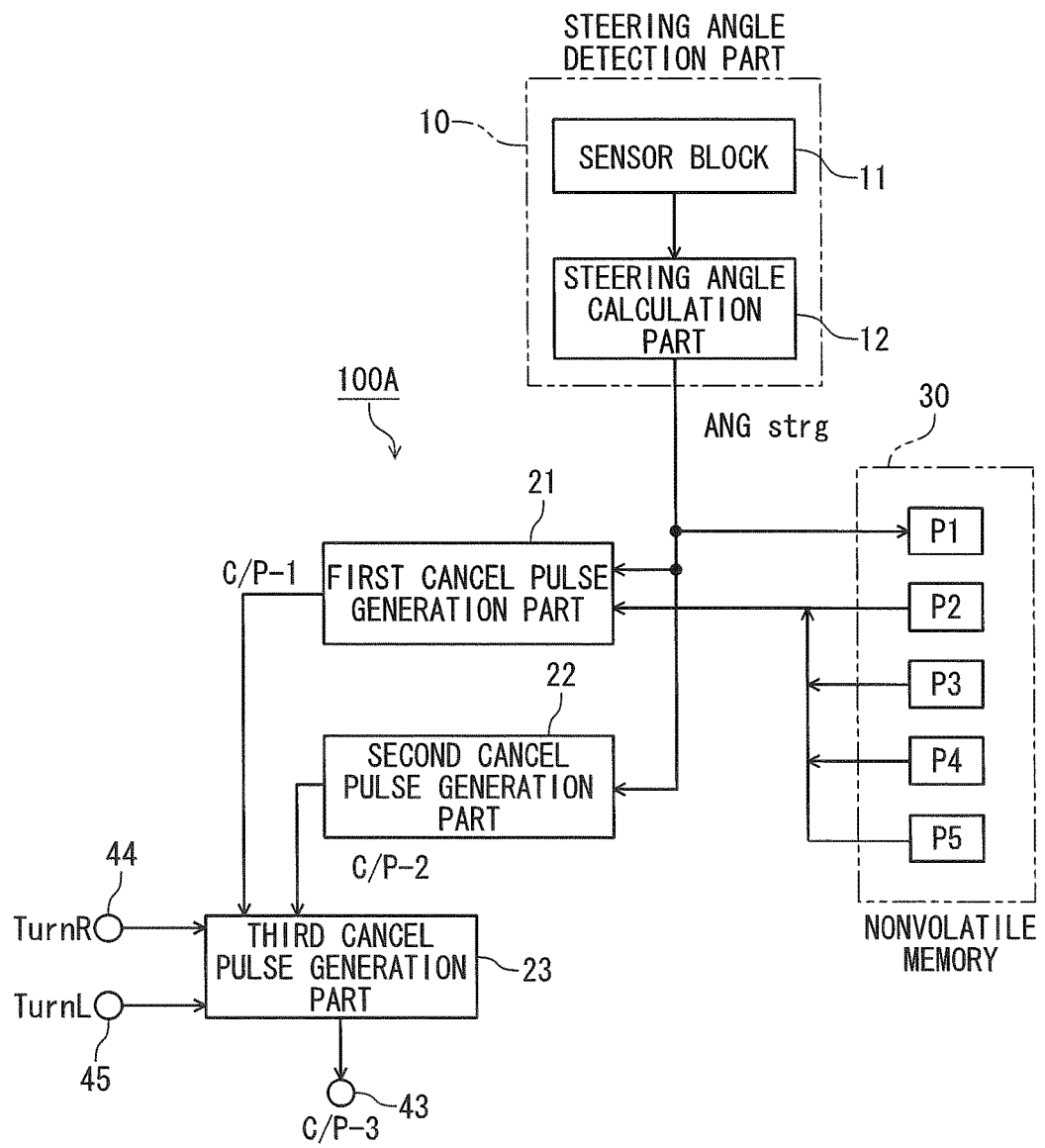
FIG. 10 is a block diagram showing functional configuration of a modified example of the turn cancel signal output device.

FIG. 10 shows the functional configuration of the modified example 100A of the turn cancel signal output device. Although the hardware of the actual electric circuit is substantially same as FIG. 3, the number of the terminals provided at the connector 103 and the contents of the signals are changed therefrom. Further, according to the change of the signals, the cancel pulse interface block 117 is changed.

As shown in FIG. 10, in this modified example 100A, a third cancel pulse generation part 23 is added as a new constituent element. Further, the first cancel pulse C/P-1 outputted from the first cancel pulse generation part 21 and the second cancel pulse C/P-2 outputted from the second cancel pulse generation part 22 are inputted into the third cancel pulse generation part 23.

Furthermore, a right turn signal TurnR and a left turn signal TurnL are inputted into the third cancel pulse generation part 23 from input terminals 44, 45 newly provided at the connector 103, respectively.

Each of the right turn signal TurnR and the left turn signal TurnL represents the current direction indicating state and is outputted from the electronic control unit (ECU) as the host device. The right turn signal TurnR is placed in an on state (Low level, for example) in the control state that the right-side direction indictors blink (right turn state of the vehicle). Similarly, the left turn signal TurnL is placed in the on state in the control state that the left-side direction indictors blink (left turn state of the vehicle).

The third cancel pulse generation part 23 generates a third cancel pulse C/P-3 based on the inputted respective signals (C/P-1, C/-2, TurnR, TurnL). The third cancel pulse C/P-3 is outputted to an output terminal 43. The output terminal 43 and the input terminals 44, 45 are disposed on the connector 103.

Thus, in the case of using the modified example 100A of the turn cancel signal output device shown in FIG. 10, the electronic control unit (ECU) as the host device can output the right turn signal TurnR and the left turn signal TurnL and input the third cancel pulse C/P-3.

The third cancel pulse C/P-3 is a signal which can be used as a trigger for terminating the blinking of each of the right and left direction indicators. To be concrete, the electronic control unit (ECU) as the host device may terminate the blinking of the right direction indicators when a pulse appears in C/P-3 in the state that the right direction indicators blink. Also, the electronic control unit may terminate the blinking of the left direction indicators when a pulse appears in C/P-3 in the state that the left direction indicators blink. In the modified example 100A, the processing for discriminating the turn cancel performed by the electronic control unit (ECU) as the host device differs from the aforesaid case utilizing the turn cancel signal output device 100. That is, since the electronic control unit (ECU) as the host device can discriminate the turn cancel merely depending on the presence/non-presence of the pulse in C/P-3, the decimating processing can be simplified as compared with the aforesaid case utilizing the turn cancel signal output device 100.

The third cancel pulse generation part 103 can generate the third cancel pulse C/P-3 according to the following condition.

In a case where the right turn signal TurnR is in the on state:

when the rising (Low→High) of the first cancel pulse C/P-1 is detected and the rotational direction represented by the second cancel pulse C/P-2 is CCW (High), a single effective pulse is outputted in C/P-3 or a signal level representing the turn cancel is outputted.

In a case where the left turn signal TurnL is in the on state:

when the rising (Low→High) of the first cancel pulse C/P-1 is detected and the rotational direction represented by the second cancel pulse C/P-2 is CW (Low), the single effective pulse is outputted in C/P-3 or the signal level representing the turn cancel is outputted.

The feature of the embodiment of the turn cancel signal output device for a vehicle according to the embodiment will be briefly summarized below as listed in [1] to [7].

[1] In the turn cancel signal output device for a vehicle (turn cancel signal output device 100 and its modified example 100A) which provides the trigger for cancelling the operating state of direction indicators mounted on the vehicle based on the operation state of the steering wheel of the vehicle, the turn cancel signal output device includes:

the steering angle detection part (10) which detects the steering angle of the steering wheel;

the first cancel pulse generation part (21) which generates the first cancel pulse (C/P-1) when the steering angle reaches a value to be detected as the edge representing the termination of turn of the vehicle, based on the steering angle detected by the steering angle detection part;

the second cancel pulse generation part (22) which generates the second cancel pulse (C/P-2) representing the rotational direction of the steering wheel, based on the steering angle detected by the steering angle detection part; and a signal output part (output terminals 41, 42) which outputs the signal reflecting the state of at least one of the first cancel pulse and the second cancel pulse.

[2] The turn cancel signal output device for a vehicle described in [1], further includes the nonvolatile memory (30) which holds the information of at least one of the parameters (P1 to P5) defining the condition for generating the first cancel pulse.

[3] The turn cancel signal output device for a vehicle described in [2], wherein the nonvolatile memory holds the first parameter (P2) representing the reference value of the steering angle for generating the first cancel pulse and the second parameter (P3) representing a fine angle for providing the hysteresis in the generation operation of the first cancel pulse, and the first cancel pulse generation part generates the first cancel pulse according to a result of the comparison between a threshold value determined by the first parameter and the second parameter and the steering angle detected by the steering angle detection part.

[4] The turn cancel signal output device for a vehicle described in [3], wherein the nonvolatile memory holds, as the third parameter (P4, P5), cancel timing information representing whether or not the output of plural pulses are to be allowed when the rotation angle of the steering wheel exceeds 360 degrees, and the first cancel pulse generation part generates the first cancel pulse according to a result of the comparison between a threshold value determined by the first parameter, the second parameter and the third parameter and the steering angle detected by the steering angle detection part.

[5] The turn cancel signal output device for a vehicle described in [2], further includes:

a data communication part (CAN interface block 116) which can perform data communication with an external device; and a data update control part (microcomputer 111) which rewrites contents of the parameters held in the nonvolatile memory based on data received by the data communication part.

[6] The turn cancel signal output device for a vehicle described in [1], further includes a self-diagnosis control part (microcomputer 111) which self-diagnoses the operation state, wherein the self-diagnosis control part inhibits output of the first cancel pulse and the second cancel pulse when a predetermined invalid state is detected.

[7] The turn cancel signal output device for a vehicle described in [1], further includes:

a turn signal input part (input terminals 44, 45) which accepts input of respective turn signals (TurnR, TurnL) representing the indication of the right turn and the left turn of the direction indicators; and the third cancel pulse generation part (23) which generates the third cancel pulse (C/P-3) based on the turn signals, the first cancel pulse and the second cancel pulse and outputs the third cancel pulse to the external device.

Although the invention is explained in detail with reference to the particular embodiment, it will be apparent for those skilled in the art that the invention can be changed and modified in various manners without departing from the spirit and range of the invention.

According to the embodiment, the electronic control unit (ECU) as the host device for controlling the turn signal lamps etc. can suitably recognize the turn cancel by the simple processing. Further, the configuration and operation of the electronic control unit (ECU) as the host device can be made common to various types of vehicles. The invention having such the effect is useful in the field of the turn cancel signal output device for a vehicle which generates the turn cancel signals.

What is claimed is:

1. A turn cancel signal output device for a vehicle which provides a trigger for cancelling an operating state of a direction indicator mounted on the vehicle based on an operation state of a steering wheel of the vehicle, the turn cancel signal output device comprising:

a steering angle detection part which detects a steering angle of the steering wheel;

a first cancel pulse generation part which generates a first cancel pulse when the steering angle reaches a value to be detected as an edge representing termination of turn of the vehicle, based on the steering angle detected by the steering angle detection part;

a second cancel pulse generation part which generates a second cancel pulse representing whether a rotational direction of the steering wheel is in a clockwise direction or a counter-clockwise direction, based on the steering angle detected by the steering angle detection part, wherein the second cancel pulse is maintained to be constant at a first voltage when the rotational direction of the steering wheel is in one of the clockwise direction and the counter-clockwise direction, and the second cancel pulse is maintained to be constant at a second voltage, different from the first voltage, when the rotational direction of the steering wheel is the other of the clockwise direction and the counter-clockwise direction; and a signal output part which outputs a signal reflecting a state of the first cancel pulse or states of the first cancel pulse and the second cancel pulse, wherein the first cancel pulse generation part is configured to generate the first cancel pulse using:

a first algorithm when a mode parameter of the turn cancel signal output device specifies a first cancellation mode specifying cancellation of a turn signal under a first condition, the first algorithm including switching a voltage of the first cancel pulse from a first voltage to a second voltage when the first condition is satisfied; and a second algorithm, different from the first algorithm, when the mode parameter specifies a second cancellation mode different from the first cancellation mode, the second cancellation mode specifying cancellation of the turn signal under a second condition, but not the first condition, the second algorithm including switching the voltage of the first cancel pulse from the first voltage to the second voltage when the second condition is satisfied, but not when the first condition is satisfied.

2. The turn cancel signal output device for a vehicle according to claim 1, further comprising:

a nonvolatile memory which holds information of at least one of a plurality of parameters defining a condition for generating the first cancel pulse.

3. The turn cancel signal output device for a vehicle according to claim 2, further comprising:

a data communication part which can perform data communication with an external device; and a data update control part which rewrites contents of the parameters held in the nonvolatile memory based on data received by the data communication part.

4. The turn cancel signal output device for a vehicle according to claim 1, wherein the signal output part including a first output terminal configured to output the signal reflecting the state of the first cancel pulse and a second output terminal configured to output the signal reflecting the state of the second cancel pulse.

5. The turn cancel signal output device according to claim 1, wherein the turn cancel signal output device cancels the operating state of the direction indicator upon detecting a rise in voltage between a first instance of the first cancel pulse and a second instance of the first cancel pulse.

6. A turn cancel signal output device for a vehicle which provides a trigger for cancelling an operating state of a direction indicator mounted on the vehicle based on an operation state of a steering wheel of the vehicle, the turn cancel signal output device comprising:

a nonvolatile memory;

a steering angle detection part which detects a steering angle of the steering wheel;

a first cancel pulse generation part which generates a first cancel pulse when the steering angle reaches a value to be detected as an edge representing termination of turn of the vehicle, based on the steering angle detected by the steering angle detection part;

a second cancel pulse generation part which generates a second cancel pulse representing a rotational direction of the steering wheel, based on the steering angle detected by the steering angle detection part; and a signal output part which outputs a signal reflecting a state of the first cancel pulse or states of the first cancel pulse and the second cancel pulse, wherein the nonvolatile memory holds a first parameter representing a reference value of the steering angle for generating the first cancel pulse and a second parameter representing a fine angle for providing hysteresis in a generation operation of the first cancel pulse, and wherein the first cancel pulse generation part generates the first cancel pulse according to a result of comparison between a threshold value determined by the first parameter and the second parameter and the steering angle detected by the steering angle detection part.

7. The turn cancel signal output device for a vehicle according to claim 6, wherein:

the nonvolatile memory holds, as a third parameter, cancel timing information representing whether or not output of plural pulses are to be allowed when a rotation angle of the steering wheel exceeds 360 degrees, and the first cancel pulse generation part generates the first cancel pulse according to a result of a comparison between a threshold value determined by the first parameter, the second parameter and the third parameter and the steering angle detected by the steering angle detection part.

8. A turn cancel signal output device for a vehicle which provides a trigger for cancelling an operating state of a direction indicator mounted on the vehicle based on an operation state of a steering wheel of the vehicle, the turn cancel signal output device comprising:

a steering angle detection part which detects a steering angle of the steering wheel;

a first cancel pulse generation part which generates a first cancel pulse when the steering angle reaches a value to be detected as an edge representing termination of turn of the vehicle, based on the steering angle detected by the steering angle detection part;

a second cancel pulse generation part which generates a second cancel pulse representing a rotational direction of the steering wheel, based on the steering angle detected by the steering angle detection part;

a signal output part which outputs a signal reflecting a state of the first cancel pulse or states of the first cancel pulse and the second cancel pulse; and a self-diagnosis control part which self-diagnoses an operation state, wherein the self-diagnosis control part inhibits output of the first cancel pulse and the second cancel pulse when a predetermined invalid state is detected.

9. A turn cancel signal output device for a vehicle which provides a trigger for cancelling an operating state of a direction indicator mounted on the vehicle based on an operation state of a steering wheel of the vehicle, the turn cancel signal output device comprising:
  a steering angle detection part which detects a steering angle of the steering wheel;
  a first cancel pulse generation part which generates a first cancel pulse when the steering angle reaches a value to be detected as an edge representing termination of turn of the vehicle, based on the steering angle detected by the steering angle detection part;
  a second cancel pulse generation part which generates a second cancel pulse representing a rotational direction of the steering wheel, based on the steering angle detected by the steering angle detection part;
  a signal output part which outputs a signal reflecting a state of the first cancel pulse or states of the first cancel pulse and the second cancel pulse;
  a turn signal input part which accepts input of respective turn signals representing an indication of a right turn or a left turn of the direction indicator; and
  a third cancel pulse generation part which generates a third cancel pulse based on the turn signals, the first cancel pulse and the second cancel pulse and outputs the third cancel pulse to an external device.

* * * * *